US010713664B1

(12) United States Patent
Alagappan et al.

(10) Patent No.: US 10,713,664 B1
(45) Date of Patent: Jul. 14, 2020

(54) AUTOMATED EVALUATION AND REPORTING OF MICROSERVICE REGULATORY COMPLIANCE

(71) Applicant: INTERNATIONAL BUSINESS MACHINES CORPORATION, Armonk, NY (US)

(72) Inventors: Manickam Alagappan, Frisco, TX (US); Marci Ramona Wojcik, Grand Blanc, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/361,382

(22) Filed: Mar. 22, 2019

(51) Int. Cl.
*G06Q 30/00* (2012.01)
*G06F 40/205* (2020.01)

(52) U.S. Cl.
CPC ......... *G06Q 30/018* (2013.01); *G06F 40/205* (2020.01)

(58) Field of Classification Search
CPC .............................. G06Q 40/018; G06F 40/205
USPC .......................................................... 717/124
See application file for complete search history.

(56) References Cited

U.S. PATENT DOCUMENTS

| 8,997,091 | B1* | 3/2015 | Watson ..................... G06F 8/60 717/175 |
| 9,306,806 | B1 | 4/2016 | Zhang |
| 9,369,478 | B2 | 6/2016 | Kumar et al. |
| 9,824,364 | B2* | 11/2017 | Galligan Davila .. G06Q 30/018 |
| 2016/0373289 | A1 | 12/2016 | Hernandez et al. |
| 2017/0345016 | A1* | 11/2017 | Meek ..................... G06F 16/951 |
| 2018/0027006 | A1 | 1/2018 | Zimmermann et al. |
| 2018/0048638 | A1* | 2/2018 | Lewis ................. H04L 63/0807 |

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
International Business Machines Corporation (IBM), "Power ISA™ Version 2.07B," Apr. 9, 2015 (pp. 1-1527).

(Continued)

*Primary Examiner* — Ryan D. Coyer
(74) *Attorney, Agent, or Firm* — Michael A. Petrocelli, Esq.; Kevin P. Radigan, Esq.; Heslin Rothenberg Farley & Mesiti P.C.

(57) ABSTRACT

Automated evaluation and reporting of microservice regulatory compliance during development and operation are provided. The method includes parsing, by a natural language parser, the set of regulations for which microservice compliance is to be evaluated, and generating an ontology including attributes, rules and policies obtained from parsing the set of regulations. A rules engine is created according to the ontology. The rules engine includes compliance rules, and an application program interface (API) that allows responses to compliance queries derived from one or more of the compliance rules. The rules engine receives responses to the compliance queries, with the microservice being instrumented with a message queue invocation as one or more annotations to facilitate processing the compliance queries. The rules engine generates a regulation-compliance report for the microservice based on the received responses to the compliance queries.

20 Claims, 13 Drawing Sheets

(56) References Cited

OTHER PUBLICATIONS

IBM Publication, "z/Architecture Principles of Operation," IBM® Publication No. SA22-7832-11, 12th Edition, Sep. 2017 (pp. 1-1902).
Kalkan et al., "Payment Card Industry Data Security Standard Compliance in Restaurants", The Journal of Hospitality Financial Management, vol. 16, No. 2 (2008) (14 pages).
Joshi et al., "Semantic Approach to Automating Management of Big Data Privacy Policies", IEEE International Conference on Big Data (2016) (10 pages).
Saha et al., "Automated Knowledge Extraction from the Federal Acquisition Regulations system (FARS)", IEEE International Conference on Big Data (2017) (8 pages).
Nagar et al., "A Semantically Rich Knowledge Representation of PCI DSS for Cloud Services", 6th International IBM Cloud Academy Conference (ICACON), Japan (2018) (8 pages).
Rosa et al., "A Survey of Security Assessment Ontologies", Renato Archer Information Technology Center (CTI), Jun. 29, 2017 (7 pages).
Espinoza et al., "Ontology-Driven Financial Regulatory Change Management: An Iterative Developments Process", (2014) (4 pages).
R. Verdecchia, "Identifying Architectural Technical Debt in Android Applications Through Automated Compliance Checking", 5th International Conference on Mobile Software Engineering and Systems, MOBILESOFT '18, (May 2018) (3 pages).
Ghaisas et al., "Towards Automating the Security Compliance Value Chain", 10th JOint Meeting on Foundations of Software Engineering, ESEC/FSE (Sep. 2015) (5 pages).
Shahin et al., "Beyond Continuous Delivery: An Empirical Investigation of Continuous Deployment Challenges", 11th ACM/IEEE International Symposium on Empirical Software Engineering and Measurement, ESEM '17 (Nov. 2017) (11 pages).
Fitzgerald et al., "Continuous Software Engineering and Beyond" Trends and Challenges, 1st International Workshop on Rapid Continuous Software Engineering, RCoSE (Jun. 2014) (10 pages).
Moyon et al., "Towards Continuous Security Compliance in Agile Software Development at Scale", 4th International Workshop on Rapid Continuous Software Engineering, RCoSE (May 2018) (5 pages).
Li et al., "What Data Should I Protect? Recommender and Planning Support for Data Security Analysts", 24th International Conference on Intelligent User Interfaces, IUI '19 (Mar. 2019) (13 pages).
Li et al. "Adding Intelligence to a Data Security Analysis System: Recommendation and Planning Support", 24th International Conference on Intelligent User Interfaces, IUI '19 (Mar. 2019) (3 pages).
Beigi-Mohammadi et al., "A DevOps Framework for Quality-Driven Self-Protection in Web Software Systems", 28th Annual International Conference on Computer Science and Software Engineering, CASCON '18 (Oct. 2018) (6 pages).
Rahman et al., "Security Practices in DevOps", Proceedings of the Symposium and Bootcamp on the Science of Security, HotSos (Apr. 2016) (4 pages).
Dullmann et al., "Exploiting DevOps Practices for Dependable and Secure Continuous Delivery Pipelines", 4th International Workshop on Rapid Continuous Software Engineering, RCoSE '18 (May 2018) (5 pages).
Schulz et al., "Towards Automating Representative Load Testing in Continuous Software Engineering", Companion of the 2018 ACM/SPEC International Conference on Performance Engineering, ICPE '18 (Apr. 2018) (5 pages).
Jaatun et al., "DevOps for Better Software Security in the Cloud Invited Paper", 12th International Conference on Availability, Reliability and Security, ICPE '17 (Aug.-Sep. 2017) (7 pages).
Rahman et al., "Software Security in DevOps: Synthesizing Practitioners' Perceptions and Practices", Proceedings of the International Workshop on Continuous Software Evolution and Delivery, CSED '16 (May 2017) (8 pages).
M. Shahin, "Architecting for DevOps and Continuous Deployment", 24th Australasian Software Engineering Conference, ASWEC '15, vol. II (Sep.-Oct. 2015) (3 pages).
Senapathi et al., "DevOps Capabilities, Practices, and Challenges" Insights from a Case Study, 22nd International Conference on Evaluation and Assessment in Software Engineering, EASE '18 (Jun. 2018) (12 pages).
Bass et al., "Security a Deployment Pipeline", 3rd International Workshop on Release Engineering, RELENG '15 (2015) (5 pages).
Dittrich et al., "Researching Cooperation and Communication in Continuous Software Engineering", 11th International Workshop on Cooperative and Human Aspects of Software Engineering, CHASE '18 (May 2018) (5 pages).
Gil et al., "A Microservices Experience in the Banking Industry", 12th European Conference on Software Architecture: Companion Proceedings (Sep. 2018) (3 pages).
Rios et al., "Self-Healing Multi-Cloud Application Modeling", 12th International Conference on Availability, Reliability and Security, ARES '17 (Aug.-Sep. 2017) (10 pages).
H. Yasar, "Implementing Secure DevOps Assessment for Highly Regulated Environments", 12th International Conference on Availablity, Reliability and Security, ARES '17 (Aug.-Sep. 2017) (4 pages).
L. Williams, "Continuously Integrating Security", 1st International Workshop on Security Awareness from Design to Deployment, SEAD '18 (May 2018) (3 pages).

\* cited by examiner

AUTOMATED EVALUATION AND REPORTING OF MICROSERVICE REGULATORY COMPLIANCE

BACKGROUND

A microservice architecture provides services that are independently deployable. In a microservice architecture, services (or microservices) are fine-grained and protocols are typically lightweight. This makes a microservice application easy to understand, develop, test, etc. Microservices can be implemented using different programming languages, databases, and hardware and software environments. Today, microservices are small in size, messaging enabled, bounded by contracts, autonomously developed, independently deployable, decentralized and often built, and released with automated processes. A microservice is not a layer within a monolithic application, but rather, is a self-contained operation or function with clear interfaces, and may have its own internal components and implement a layered architecture. A microservice architecture is commonly adopted for cloud-native applications, and applications using lightweight container deployment.

In operation, a microservice may need to comply with one or more sets of regulations. For instance, a payment microservice needs to comply with the Payment Card Industry Data Security Standard (PCI DSS), which is an information security standard for organizations that handle branded credit cards. The PCI standard is mandated and administered by the Payment Card Industry Security Standards Council, with the set of regulations to be complied with being available on the PCI DSS compliance authority website. Validation of compliance is typically performed periodically manually, such as by, for instance, an external qualified security accessor, or by a firm-specific internal security accessor (ISA) who creates a report on compliance for an organization, and/or via a self-assessment questionnaire (SAQ) report prepared internally.

SUMMARY

Certain shortcomings of the prior art are overcome and additional advantages are provided through the provision, in one aspect, of a computer-implemented method of evaluating microservice compliance with a set of regulations. The method includes parsing, by a natural language parser, the set of regulations for which microservice compliance is to be evaluated, where the set of regulations is accessed by the natural language parser across a network, and generating an ontology in a local database including attributes, rules and policies obtained from the parsing of the set of regulations. A rules engine is created according to the ontology, where the rules engine includes compliance rules, and an application program interface (API) that allows responses from a microservice to compliance queries derived from one or more of the compliance rules. The rules engine receives responses from the microservice to the compliance queries, with the microservice being instrumented with a message queue invocation as one or more annotations to facilitate processing the compliance queries provided by the rules engine. The method includes generating, by the rules engine, a regulation-compliance report for the microservice based on the received responses to the compliance queries.

Computer systems and computer program products related to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
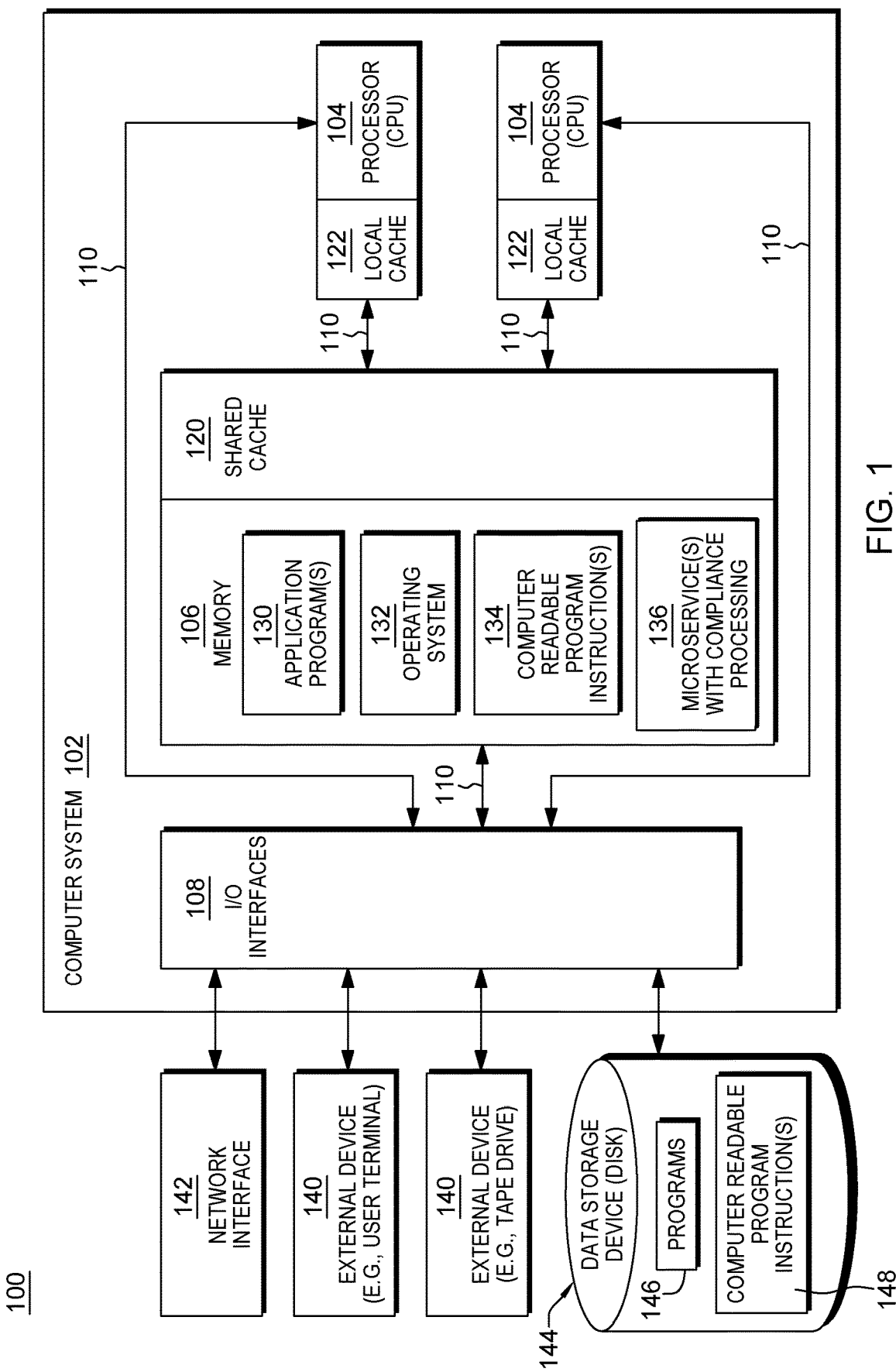
FIG. 1 depicts a block diagram of one embodiment of a data processing system which can implement processing, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, for facilitating processing within a server-based processing environment by providing a facility for evaluating microservice compliance with a set of regulations of a compliance authority.

The illustrative embodiments may be described using specific code, designs, architectures, protocols, layouts, schematics, or tools only as examples, and are not limiting to the illustrative embodiments. Furthermore, the illustrative embodiments are described in some instances using particular software, tools, and data processing environments only as example for clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

As understood by one skilled in the art, program code, as referred to within this application, can include software and/or hardware. For instance, program code in certain embodiments of the present invention can include fixed function hardware, while other embodiments can utilize a software-based implementation of the functionality described. Certain embodiments can combine both types of program code. One example of program code, also referred to as one or more programs, is depicted in FIG. 1 as microservice(s) with compliance processing 136, which can be stored in memory 106 of a computer system (or resource) 102.

With reference to the figures, and in particular with reference to FIG. 1, an example diagram is shown of a data processing environment in which illustrative embodiments can be implemented. FIG. 1 is only an example and is not intended to assert or imply any limitation with regard to the environments in which different embodiments can be implemented. A particular implementation may make many modifications to the depicted environment based on the following description.

With reference to FIG. 1, as noted this figure depicts a block diagram of a data processing system in which one or more aspects of the present invention can be implemented. Data processing system 100 is an example of a computer, such as server, or other type of device, in which computer usable program code or instructions implementing one or more processes may be located for the illustrative embodiments.

In one example, data processing system 100 can be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture is described in "z/Architecture Principles of Operation," IBM® Publication No. SA22-7832-11, 12th Edition, September 2017, which is hereby incorporated herein by reference in its entirety.

In another example, the processing system may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The data processing system may also be based on other architectures, including, but not limited to, the Intel x86 architectures. Other examples also exist.

As shown in FIG. 1, data processing system 100 includes, for instance, a computer system 102 shown, e.g., in the form of a general-purpose computing device. Computer system 102 can include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Processor 104 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 can include, for instance, a cache 120, such as a shared cache, which may be coupled to local caches 122 of processors 104. Further, memory 106 can include one or more programs or applications 130, an operating system 132, and one or more computer readable program instructions 134, as well as microservice(s) with compliance processing logic 136 such as disclosed herein. Additionally, or alternatively computer readable program instructions 134 can be configured to carry out one or more other functions of certain embodiments of the invention.

Computer system 102 can also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 can store one or more programs 146, one or more computer readable program instructions 148, and/or data, etc. The computer readable program instructions can be configured to carry out functions of one or more aspects of the present invention.

Computer system 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 can be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and cloud computing environments that include any of the above systems or devices, and the like.

As noted, the depicted example in FIG. 1, and discussed above, is not meant to imply architectural limitations. Further, as noted, data processing system 100 of FIG. 1 could be, for instance, a server, workstation, tablet computer, laptop computer, or other device.

As noted initially, modern application architectures seek to benefit from the development and operational agility offered by microservices hosted in cloud computing environments. A microservice is a small, well defined bit of functionality created by separating off a vertical slice of domain functionality from, for instance, a monolithic application, and hosting the service on one or more cloud computing resources. The goals in architecting or re-architecting applications, or critical parts of applications, in this way stem from the notion that smaller units of functionality (i.e., microservices) should possess well-defined and strong contracts to be able to form the basis for a highly available and scalable cloud-based service application program interface (API). Each microservice typically has one responsibility, one strong contract, and it does that one function very well. A microservice of this nature can then be managed by the cloud-hosting environment, usually a container management system, that is then able to scale the microservice for high availability of performance, replicating the microservice across servers (scaling horizontally) or adding memory to containers (scaling vertically).

Figure 2:
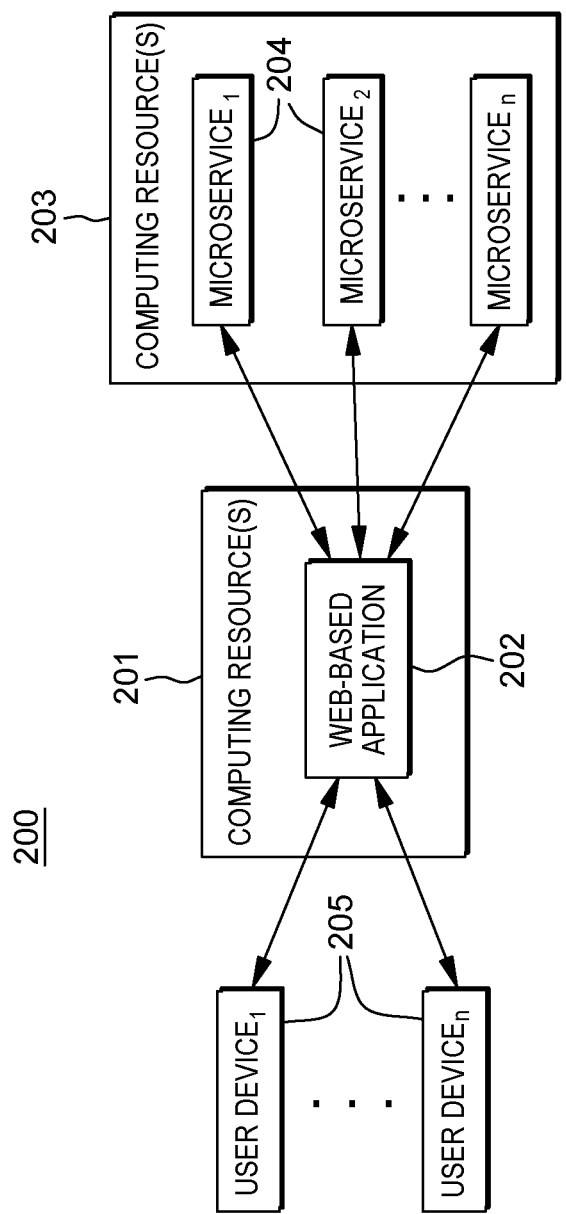
FIG. 2 depicts one embodiment of an environment into which various aspects of an embodiment can be implemented, in accordance with one or more aspects of the present invention.

By way of example, FIG. 2 depicts a generalized computing environment 200, in which various aspects of one or more embodiments of the present invention can be implemented. Computing environment 200 includes computing devices, including one or more computing resources 201 that execute program code of a web-based application 202, and one or more computing resources 203 that execute program code associated with one or more microservices 204. In operation, one or more user devices 205 access web-based application 202, during, or a result of which, one or more microservices 204 can be accessed. For illustrative purposes only, web-based application 202 is depicted in FIG. 1 as being housed on separate computing resource(s) 201 than computing resource(s) 203 hosting microservices 204. This is a non-limiting example of an implementation, and in one or more other embodiments, the program code of web-based application 202 and microservices 204 could also share a computing resource and/or a shared cloud computing environment. The computer resources 201, 203 can be based on a variety of computing system environments or configurations, such as the above-described computer systems of FIG. 1.

As noted, microservices offer many benefits, as they are highly decoupled, scalable, discoverable, and easy to work with for development and operations. In view of these benefits, and others, computer architects continue to take advantage of the microservice platform to perform a wide variety of computing applications.

Managing the development, testing, integration, deployment, execution and monitoring of microservices would be difficult without automation. Automation enables the end-to-end production and maintenance of a microservice today. The DevOps (development and operations) pipeline is a well-defined sequence of stages that go into the analysis, environment setup, build, testing, integration, deployment, execution, reporting, monitoring, as well as any number of other activities, which can be defined in any DevOps pipeline of operations. The key to an effective DevOps pipeline is automation. The DevOps build is triggered, either manually or upon some event, like a source code commit or change. Once the build (or rebuild) starts, each defined stage in the build is performed automatically by the pipeline. This efficient process is able to occur due to having preconfigured the operational environment, as well as having provided computer program code to execute each stage in the pipeline.

Recent advances in refactoring monolithic operations into cloud-based microservices and server-less functions have simultaneously fostered other efforts to develop efficient development, testing, integration, and deployment of these microservices to the cloud. DevSecOps (development and security and operations) computing cultures and methodologies are being designed to streamline the required development and operation activities. DevSecOps pipelines create an extensible framework to enable the systematic integration of useful external tools incorporated on demand within the pipeline. This lose coupling of computing tools provides the development and operation pipeline with ever-growing capabilities to enrich and modernize cloud-based services. The introduction of DevSecOps pipelines into highly regulated environments brings with it the need to automate compliance activities, especially in the area of external tool integration. Provided herein, in one or more aspects, are mechanisms to achieve continuous compliance within the DevOps or DevSecOps pipeline as it creates, delivers and executes microservices and server-less functions in the cloud-hosted environment for highly regulated environments, such as payment processing, pharmaceutical, healthcare, etc.

Advantageously, disclosed herein are enhanced compliance monitoring and reporting facilities for use in a microservices architecture. In one or more embodiments, a microservice ontology is used that is dynamic and automatically incorporates in the microservice space changes to the set of regulations of the compliance authority essentially as they occur. The monitoring and reporting approach is further dynamic and extensible to monitor and provide reporting for newly refactored microservices separated from, for instance, a monolithic application, while still upholding the spirit of a true microservice design.

Embodiments of the present invention include a computer-implemented method, a computer program product, and a computing system, where program code executing on one or more processors provides evaluation of microservice compliance with a set of regulations. Further, embodiments of the present invention include program code that provides a regulation-compliance report, such as a self-assessment questionnaire (SAQ) report, for the microservice based on the evaluation of the microservice compliance with the set of regulations.

In one or more embodiments, the disclosed method includes parsing, by natural language machine processing, the set of regulations for which microservice compliance is to be evaluated, where the set of regulations is accessed by the natural language parser across the network, and generating an ontology in a local database including attributes, rules and policies obtained from parsing the set of regulations. A rules engine is created according to the ontology, with the rules engine including compliance rules, and an application program interface (API) that allows responses to compliance queries derived from one or more of the compliance rules. The rules engine receives responses from a microservice to the compliance queries, with the microservice being instrumented with a message queue invocation as one or more annotations to facilitate processing the compliance queries (and enforce applicable compliance rules) provided by the rules engine. The rules engine generates, in one or more embodiments, a regulation-compliance report, such as a self-assessment questionnaire (SAQ) report, for the microservice based on the received responses to the compliance queries, and stores the report, for instance, in local metadata store, as well as provides the report to a compliance auditor and/or authority.

As explained herein, a unique approach to extracting compliance attributes, rules and policies, and then applying them to microservices, is disclosed. In one or more embodiments, the microservice being evaluated for compliance is a cloud-based microservice, and one or more (or all) aspects of the evaluating can also be implemented as one or more microservices, which can also be cloud-based microservices (in one embodiment).

Figure 3:
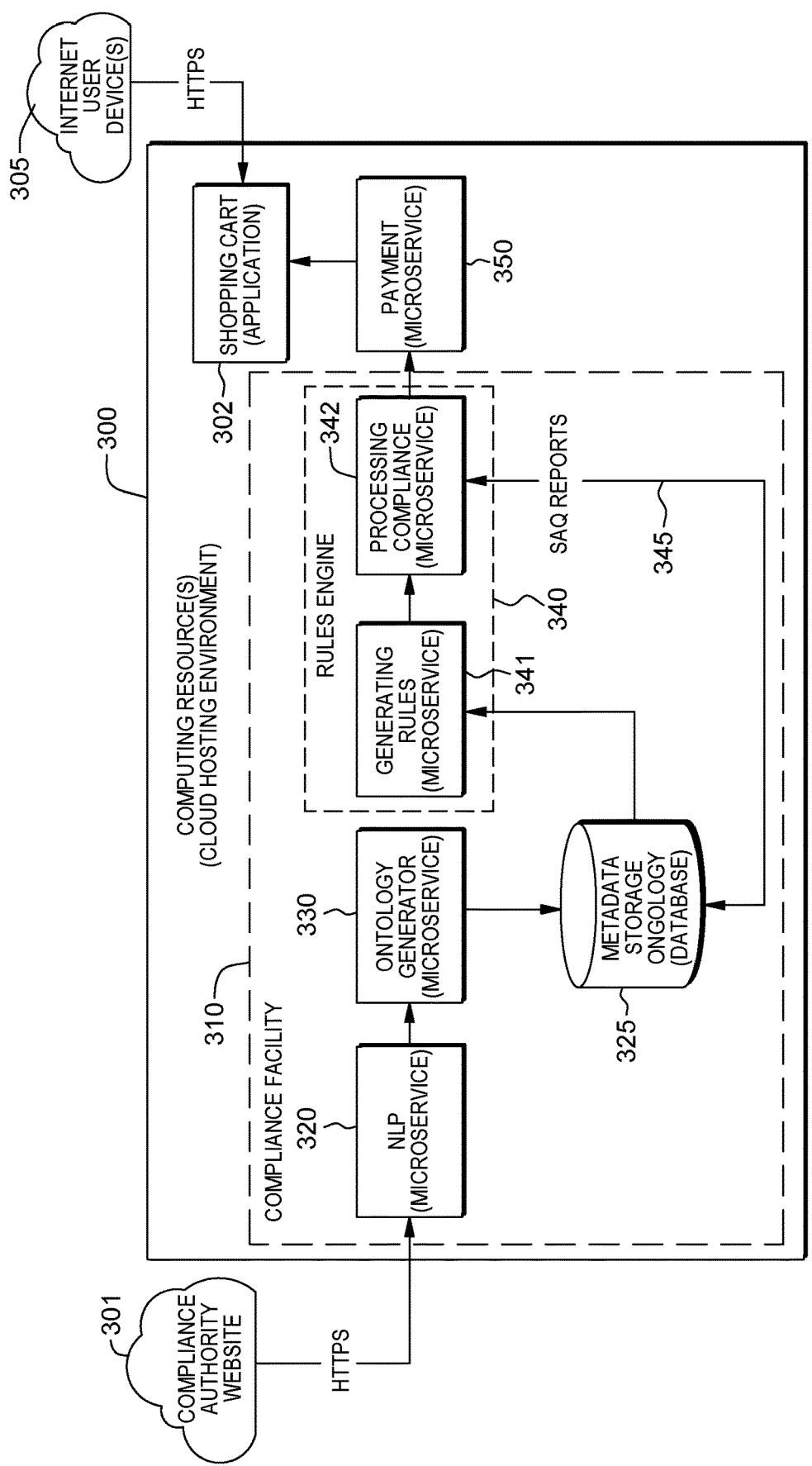
FIG. 3 depict a block diagram of one embodiment of a system for evaluating microservice compliance with a set of regulations of a compliance authority, in accordance with one or more aspects of the present invention.

FIG. 3 is a block diagram of one embodiment of a system 300 for evaluating microservice compliance with a set of regulations of a web-based compliance authority 301, in accordance with one or more aspects of the present invention. As illustrated, system 300 resides on computing resources, such as within a cloud-hosting environment. System 300, in the embodiment depicted, provides continuous compliance verification to a microservice 350, such as an external payment microservice, serving a web-based application 302, such as a shopping cart application, accessed by one or more Internet user devices 305. Note in this regard that, shopping cart 302 and payment microservice 350 are provided by way of example only. As understood in the art, shopping cart application 302 relies, in operation, on payment microservice 305 for compliant credit card processing. In one or more embodiments, the payment service relies upon up-to-date compliance evaluations provided by a compliance facility 310 of system 300.

As illustrated in FIG. 3, in one or more embodiments, components of compliance facility 310 are implemented as one or more microservices within the cloud-hosting environment. Compliance facility 310 includes a natural language parser (NLP) 320 which accesses, via a network such as the Internet, compliance authority website 301 to obtain a set of regulations applicable to microservice 350 to be evaluated and reported on. For instance, in the example of a payment microservice, the PCIS DSS is a publicly available, standard of rules and regulations that govern the activities of the payment card industry, as administered by the Payment Card Industry Security Standards Council. In implementation, one or more aspects of compliance facility 310 can use artificial intelligence or a cognitive analysis agent (such as IBM Watson®). For instance, natural language parser (or natural language machine processing) 320 is used in one embodiment to parse the set of regulations ascertained from compliance authority website 301, with the set of regulations being specific to microservice 350 to be evaluated, and which relate to a particular compliance aspect. An ontology generator service or feature 330 generates an ontology which can take a variety of formats but include, for instance, attributes, rules and policies obtained from parsing the set of regulations. The ontology is saved, in one or more embodiments, in a metadata storage (ontology) database 325 of, or accessible to, compliance facility 310.

By way of example, applying the methods of artificial intelligence to any entity and its related processes first requires a representative ontology. Ontologies are computer representations of that real world entity and its relations and processes. An ontology is bounded and there can be many different ontologies for the same entity depending on the relations and processes being modeled by the ontology. Consider a drone. A drone is a worldly entity designed to fly around and operate remotely in collaboration with a controlling agent. It has a range of operations and must operate in controlled airspace in a highly regulated environment. It typically communicates wirelessly to its controlling agent, responds to flight directions, monitors its own position, transmits data, takes photos, videos, record sounds, etc. In order for the drone to be manufactured to be legally operational within a highly regulated environment, the required legal and governance boundaries cannot be arbitrary. The governance boundaries and expectations for the drone must be elaborated and communicated in a clear manner to the engineer, designer, manufacturer, distributor and operator. This usually happens by means of field bulletins, compliance websites, manuals, books of standards, etc. But for any computing operations related to the drone, a computer is not able to digest and use these human forms of communication. The computer needs some kind of representation of the drone entity, how it relates to the engineering and compliance lifecycles and its processes during its operations. This computing model of the drone, its relations and its processes is called an ontology. To model the drone's ontology, one would create the representative set of DDL (data definition language) files, DML (data manipulation language) files, TCL (transaction control language) files that describe the drone, the BOM (bill of material) containing necessary data related to design and engineering of the drone, and the BOP (bill of process) for the manufacturing and final assembly of the drone, and the governing compliance rules and regulations. Once the drone is characterized in a database, then the drone's computer representation can be subject to analysis and automation provided for by tools of artificial intelligence. Ontologies are not and should not be static representations however. As the worldly entity and its processes change, the ontology should adjust dynamically. Visualizing the drone's ontology described above:
Entity: Drone
Entity: BOM (Bill of Material)
Entity: BOP (Bill of Process)
Entity: Governance (Compliance Rules for Legal Engineering, Manufacturing and Operation)
Entity: Remote Controlling Agent
Entity: Wireless network
Entity: Camera
Relationships:
Wireless Network←Compliance Rules
Remote Controlling Agent←Compliance Rules
Drone←Compliance Rules
Wireless Receiver←Compliance Rules
Camera←Compliance Rules
BOM←Compliance Rules
BOP←Compliance Rules In addition, the cognitive analysis agent creates, for instance, via machine learning, a rules engine service 340 according to the ontology. Creating the rules engine includes creating compliance rules 341, and the rules engine is created with an application program interface (API) that allows responses to compliance queries derived from, or associated with, one or more of the compliance rules. A compliance processing service 342 is also part of rules engine 340, and provides the applicable compliance rules and/or applicable compliance queries to microservice 350 to be evaluated, as well as generates reports, such as the Self-Assessment Questionnaire (SAQ) report 345, which when generated, can be saved into local data storage (e.g., metadata storage 325), as well as transferred to, for instance, a compliance auditor and/or authority site across the Internet (by way of example)

An example compliance rule can be taken from the PCI DSS version 3.2.1 standard, post-processed through the NLP, and curated for use in a custom annotation that instruments Payment microservice methods. By way of example, consider:

PCI DSS Compliance Regulation Requirement 3: Protect Stored Cardholder Data.
  3.1 Keep cardholder data storage to a minimum by implementing data retention and disposal policies, procedures and processes that include at least the following for all cardholder data (CHD) storage:
    Limiting data storage amount and retention time to that which is required for legal, regulatory, and/or business requirements
    Specific retention requirements for cardholder data
    Processes for secure deletion of data when no longer needed
    A quarterly process for identifying and securely deleting stored cardholder data that exceeds defined retention.
ONTOLOGY Fragment: PAYMENT_CHD
PCIDSS Compliance Regulations
  Policies
  Policy
    Rule 1
    Rule 2
    Rule 3
    Rule 3.1 Relations to Standard Values
    CHD_DATA_STORAGE_AMOUNT<=CHD_STD_DSA
    CHD_DATA_RETENTION_TIME<=CHD_STD_RT
    CHD_SPECIFIC_RETENTION_REQ_ELABORATED:
      Y: N (CHD_STD_RETENTION)
    CHD_SPECIFIC_RETENTION_REQ_MET: Y: N
    CHD_SECURE_DATA_RET<=CHD_STANDARD_EXP
    CHD_SECURE_DATA_IDENT>CHD_STANDARD_EXP
    CHD_SECURE_DATA_DELETED>CHD_STANDARD_EXP
    Rule 4
  Request Data
    CHD_DATA_STORAGE_AMOUNT
    CHD_DATA_RETENTION_TIME
    CHD_SPECIFIC_RETENTION_REQ_ELABORATED
    CHD_SPECIFIC_RETENTION_REQ_MET
    CHD_SECURE_DATA_RET
    CHD_SECURE_DATA_IDENT
    CHD_SECURE_DATA_DELETED
  Response Data
    COMPLIANCE_STATUS (Y/N)
  SAQ
    R3_COMPLIANCE_STATUS (Y/N/NA)
    R3_COMPLIANCE_NA_COMMENTS
    R3_COMPLIANCE_NO_IMPLEMENTATION_STAGE
    R3_COMPLIANCE_EST_DATE_COMPLETION_MILESTONE
    R3_COMPLIANCE_COMMENTS
    R3_COMPLIANCE_REGULATION_VERSION
    R3_COMPLIANCE_SAQ_TEMPLATE
    R3_COMPLIANCE_DIGITAL_SIGNATURE
    R3_COMPLIANCE_DATE_OF_COMPLETION
Status
Microservice Instrumentation with custom annotation (protectStoredCardholderData):
@protectStoredCardholderData ("Priority=1", "RuleSet=3", "Group=Admin", "Report Switch=Y", "AckNotfy=Y",)
accessCardholderData( ) {
  readCardholderAccountInfo( );
}

The @protectStoredCardholderData( ) custom annotation is a messaging interface between the microservice and the rules engine. It can instrument the microservice at the service level, the method level or inline within any of the methods of the microservice for fine grained control where needed. In this scenario, the instrumentation happens at the method level. Before the microservice method is allowed to execute, the custom annotation will execute, requesting a rules evaluation from the rules engine. The rules engine ensures its own rules are up to date with the latest compliance version, and if so will process the methods request for compliance evaluation based on the ontology's metadata standard data and the data sent to it by the microservice. The rules engine will evaluate the data and send back a "yes" or "no" (Y/N) response to the microservice which allows it to execute if the compliance answer is "yes". If "no", then the method raises an alert to the overall Payment microservice for proper remediation.

The program code and embodiments of the present invention disclosed herein perform (in one or more embodiments) cognitive analysis to parse the set of regulations from the authority website, generate the ontology, and create the rules engine, which provides the compliance service for evaluating microservice compliance with a set of rules. As part of this process, machine learning can be employed. Machine learning (ML) solves problems that cannot be solved by numerical means alone. In a machine learning-based example, program code extracts various features/attributes from the generated ontology resident, for instance, in the metadata storage. In creating the rules engine, including identifying compliance rules and associated compliance queries, the program code can utilize various techniques to select features (elements, patterns, attributes, etc.) including, but not limited to, diffusion mapping, principle component analysis, recursive feature elimination (a brute force approach to selecting features), and/or a Random Forest to select, for instance, the applicable compliance rules obtained from natural language parsing of the set of regulations from the compliance authority website. The program code can utilize a machine learning algorithm to train the rules engine, including providing classification, rankings or weights for extracted data or conclusions, so the program code can create the rules engine from the stored ontology.

As noted, one or more embodiments of the present invention can utilize IBM Watson® as a cognitive agent to create the rules engine. IBM Watson® is a Registered Trademark of International Business Machines Corporation, Armonk, N.Y., USA. In embodiments of the present invention, the program code interfaces with IBM Watson® application program interfaces (APIs) to perform a cognitive analysis of the obtained data. In some embodiments of the present invention, the program code interfaces with the application program interfaces (APIs) that are part of a known cognitive agent, such as the IBM Watson® Application Program Interface (API), a product of International Business Machines Corporation, to determine and/or evaluate microservice compliance, and generate a report based thereon.

In some embodiments of the present invention, certain of the APIs of IBM Watson® API include a cognitive agent that include one or more programs, including, but not limited to, natural language classifiers, Retrieve and Rank (i.e., a service available through the IBM Watson® Developer Cloud that can surface the most relevant information from a collection of data, concept/visual insights, trade-off-analytics, document conversion, and relationship extraction). In an embodiment of the present invention, one more programs analyze the data obtained by the program code across the one or more sources utilizing one or more of a natural language classifier, Retrieve and Rank APIs, and trade-off-analytics APIs.

In some embodiments of the present invention, the program code implementing compliant facility 310 can utilize a neural network to analyze collected data relative to, or to facilitate, compliance evaluation of a microservice. Neural networks are a programming paradigm, which enable a computer to learn, for instance, from obtained data. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neutral networks are non-linear statistical data modeling tools. They are usually used to model complex relationships between inputs and outputs, or to identify patterns (e.g., states) in data (i.e., neural networks are non-linear statistical data modelling or decision-making tools). In general, program code utilizing neural networks can model complex relationships between inputs and outputs, and identify patterns in data. Because of the speed and efficiency of neural networks, especially when parsing complex data sets, neural networks and deep learning provide solutions to many problems, which the program code and embodiments of the present invention can utilize when obtaining and parsing data, and building and/or applying the rules engine to evaluate a particular type of compliance of a microservice.

In one or more embodiments, where the microservice is a payment microservice, and compliance is being evaluated, for instance, via the PCI DSS set of regulations, yes/no compliance decisions are received or generated at the rules engine from responses back from the microservice, and a report, such as an SAQ report, is generated for storage in the metadata store. In implementation, the rules engine operates on curated rules and policies created from the ontology generation, which receives up-to-date rules and policies from the natural language parser service that retrieved the up-to-date rules and policies from the external compliance authority website.

Note from the description provided herein that the rules engine uses a dynamically generated ontology to query metadata and, for instance, match an ontology details template with the set of rules of the compliance authority. The rules engine can use the generated compliance rules or template to, for instance, engage a consumer/producer and rules evaluator during, for instance, rest operations. Rules validation is a minimum engagement process of the compliance facility. In one or more embodiments, the compliance facility automatically initiates and performs the compliance cycle, and reports any deviations from the current authority rules and regulations. The microservice is configured to possess one or more supporting custom annotation(s) that integrate with the compliance facility within, for instance, the business logic layer.

In a payment compliance cycle example, the compliance facility identifies all locations of a cardholder's data, taking an inventory of IT assets for compliance processing, and analyzes information for vulnerabilities that could expose, for instance, the cardholder's data. Identified vulnerabilities can be repaired, securely removing any unnecessary data storage, and implementing secure business processes. A report can document assessment and remediation details, and compliance reports can be submitted to the applicable compliance authority. In one or more embodiments, the report is a self-assessment questionnaire (SAQ) report that can be electronically signed by the compliance facility. The SAQ report can include, in one or more embodiments, a set of questions corresponding to the PCI DSS requirements designed for service providers, and an attestation of compliance or certification that the appropriate self-assessment has been performed.

Figure 4A:
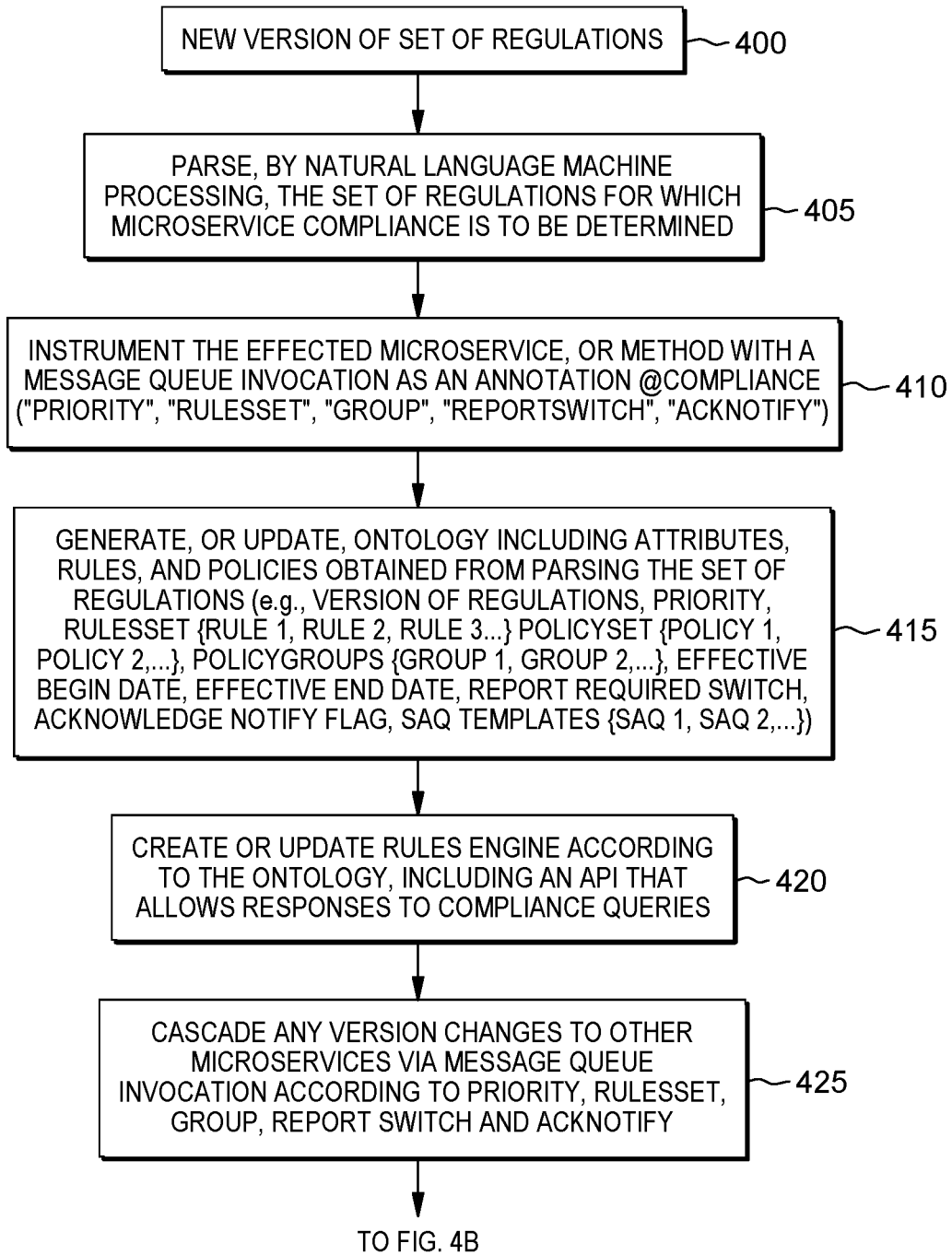
FIGS. 4A & 4B depict one embodiment of a process of evaluating microservice compliance with a set of regulations of a compliance authority, in accordance with one or more aspects of the present invention.
Figure 4B:
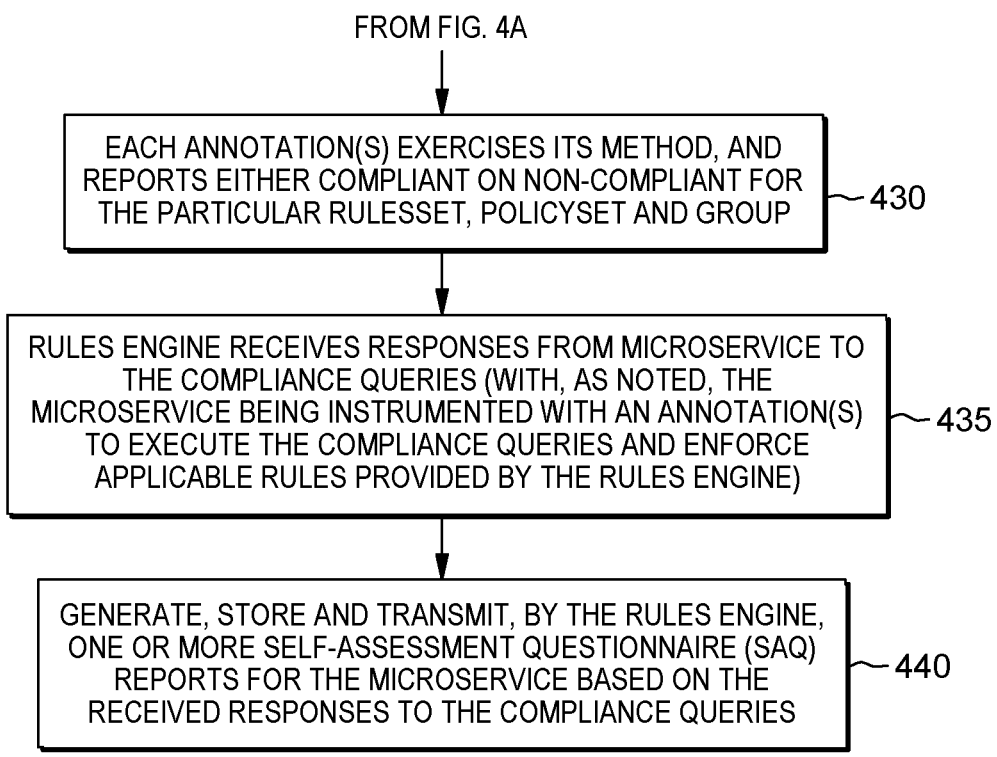

FIGS. 4A & 4B depict an overview of one embodiment of an automated evaluation and reporting of microservice regulatory compliance, in accordance with one or more aspects of the present invention.

Referring to FIG. 4A, compliance facility processing determines whether a new version of the set of regulations exists 400, for instance, by accessing an applicable set of regulations at a compliance authority website across a network, such as the Internet. If the curated set of rules is not out of date, then the locally stored ontology and report (or SAQ) templates for compliance checks can be used. Otherwise, the natural language parser parses, in one or more embodiments, and formats the revised set of compliance regulations, and stores the information as a new ontology in the local database for the compliance facility, against which microservice compliance is to be determined 405. In one or more embodiments, the ontology fully characterizes all concepts, notations, properties and attributes from the set of regulations in order to be able to enforce compliance. As part of the process, the microservice to be evaluated for compliance is instrumented with an ability to process compliance queries and enforce applicable compliance rules provided by, for instance, the rules engine. In one example, the microservice is instrumented with a message queue invocation as one or more annotations: @compliance ("Priority", "RuleSet", "Group", "Report Switch", "AckNotfy") 410. Note that the instrumentation by annotation is one embodiment only for providing the microservice with the ability to receive and process the compliance queries. Also note that the annotation(s) can include more or less, or different, attributes than those noted by example above.

An ontology is generated or updated, including attributes, rules and policies obtained from parsing the set of regulations 415. In one embodiment, the ontology can include some or all of at least the following fields: Version of Set of Regulations, Priority, RuleSet {Rule 1, Rule 2, Rule 3 . . . }, PolicySet {Policy 1, Policy 2, Policy 3 . . . }, PolicyGroups {Group 1, Group 2, Group 3 . . . }, Effective Begin Data, Effective End Date, Report Received Switch, Acknowledgment Notify Flag, SAQ Templates {SAQ 1, SAQ2 . . . }. The rules engine is created or updated according to the ontology 420. The rules engine includes compliance rules, and has an application program interface (API) that allows responses to compliance queries derived from, or associated with, one or more of the compliance rules. Any version changes are cascaded to other microservices via message queue invocation according to Priority, RuleSet, Group, ReportSwitch, and AckNotfy 425.

Referring to FIG. 4B, each annotation(s) exercises its method, and reports either compliant or non-compliant for the particular RuleSet, PolicySet and Group 430. The rules engine receives the responses from a microservice to the compliance queries (with, as noted, the microservice being instrumented with a message queue invocation as an annotation(s) to execute the compliance queries and enforce applicable rules provided by the rules engine) 435. The rules engine generates, stores, and transmits one or more reports, such as one or more Self-Assessment Questionnaire (SAQ) reports, for the microservice based on the received responses to the compliance queries 440. In one or more embodiments, the automated evaluation reporting and microservice regulatory compliance can also include curating the RuleSet to a ConsumableRuleSet {CRule1, CRule2 . . . }, and the ConsumableRuleSet (CRS) can be integrated into the DevOps pipeline, to facilitate integration of the compliance facility into the DevOps pipeline, as described herein.

Figure 5:
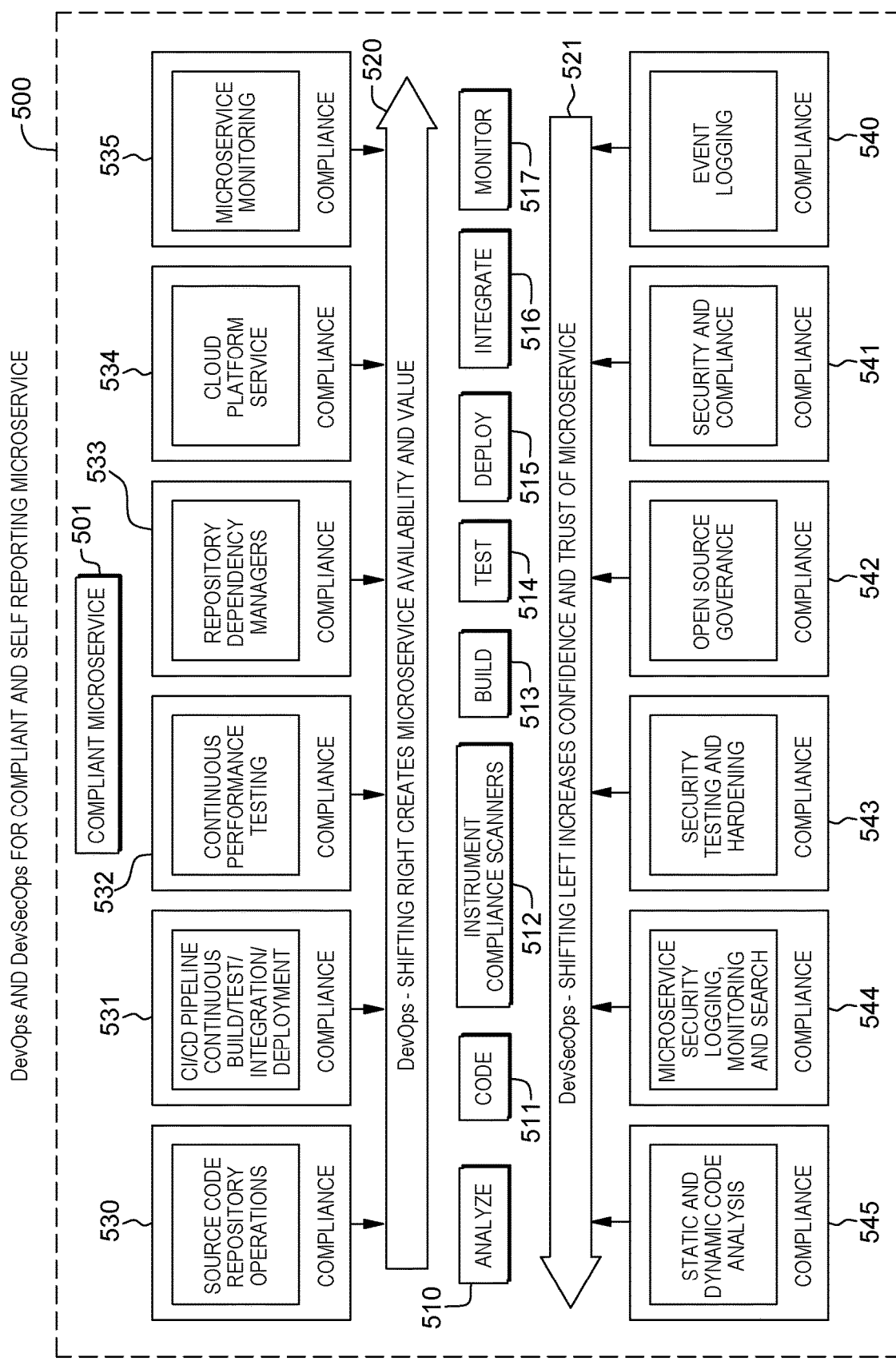
FIG. 5 is a block diagram of one embodiment of integrating compliance into a development and operations (DevOps) pipeline and/or development and security and operations (DevSecOps) pipeline, in accordance with one or more aspects of the present invention.

FIG. 5 depicts one embodiment of a DevOps (development and operations) and/or DevSecOps (development and security and operations) environment 500 with compliant self-reporting of a microservice 501, in accordance with one or more aspects of the present invention. In this figure, the development and operations environment 500 implements (for instance, in an automated manner) development and operations logic, including analyze logic 510, code logic 511, instrument compliance scanners logic 512, build logic 513, test logic 514, deploy logic 515, integrate logic 516, and monitor logic 517. As illustrated, development and operations logic shifts right to create the microservice availability and value, for instance, in a cloud-based environment 520.

The DevOps cycle can use a variety of external tools or repositories, including, for instance, a source code repository operations 530, a CI/CD pipeline continuous build/test/integration/deployment tool 531, a continuous performance testing tool 532, a repository dependency manager tool 533, a cloud platform services component 534, and a microservice monitoring tool 535, which in accordance with one or more aspects of the present invention, can each be wrapped with compliance processing such as disclosed herein. Shifting left on the pipeline enables continuous compliance within all stages of the DevOps pipeline 521, increasing confidence and trust of the microservice (in the cloud-based environment), and producing a DevSecOps pipeline. Shifting left on the pipeline enables compliance within all stages of the DevOps CI/CD (continuous integration/continuous delivery) pipeline (or tool chain) used to develop, test, integrate and monitor each cloud-based microservice. As illustrated, the continuous compliance can be associated with event logging 540, security and compliance 541, open source governance 542, security testing and hardening 543, microservice security logging, monitoring and searching 544, and static and dynamic code analysis 545.

As illustrated, continuous compliance can be maintained at every stage of the DevOps pipeline to minimize the risk of security and privacy breaches as specified in, for instance, the compliance authority's rules and policies. As explained herein, a report, such as an individual self-assessment questionnaire (SAQ), can be generated for each stage automatically, with a resolved (or combined) SAQ report being generated and stored at the end of the DevOps cycle for the microservice. As the deployed microservice runs in the cloud, periodic SAQs can be generated according to the preconfigured cadence of the system.

Those skilled in the art will note from the above discussion that external tools can be configured for use in the DevSecOps pipeline and perform a variety of functions as disclosed. Typically, there are source code analyzers, for instance, JaCoCo (Java Code Coverage) and Veracode Static Analysis, Network and Firewall analyzers, Risk and Vulnerability analyzers (for instance, Fortify), CI/CD automation tools (e.g., Jenkins), etc. There are a number of unbounded external tools that can be integrated into a DevSecOps pipeline, with each tool itself needing to comply with the defined domain security regime, as well as participate in the rules engine to which it will provide information during the continuous compliance automated processing disclosed herein.

Figure 6A:
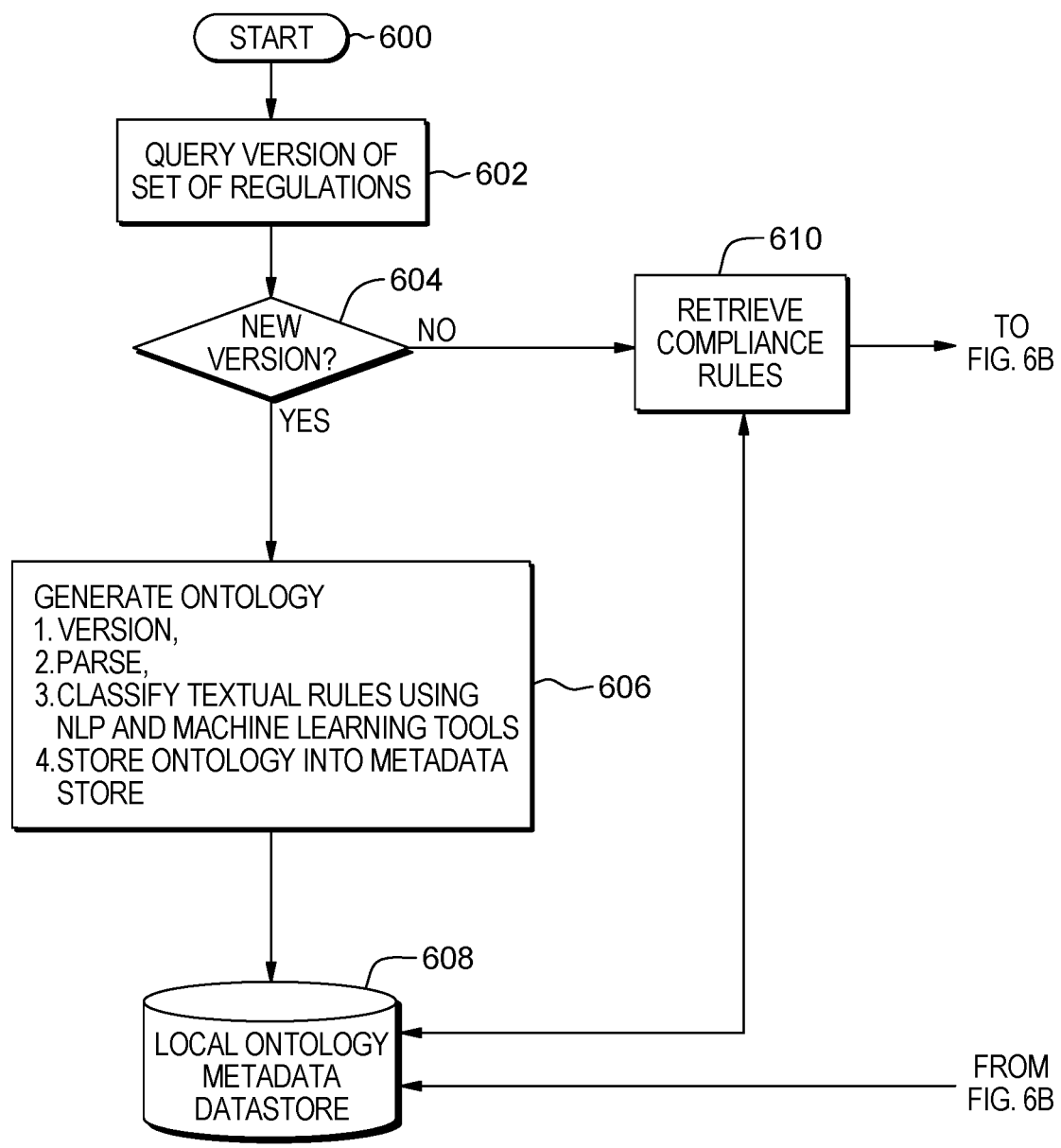
FIGS. 6A & 6B depict one embodiment of logic for applying continuous compliance with a set of regulations across a development and operations pipeline of a microservice, in accordance with one or more aspects of the present invention.
Figure 6B:
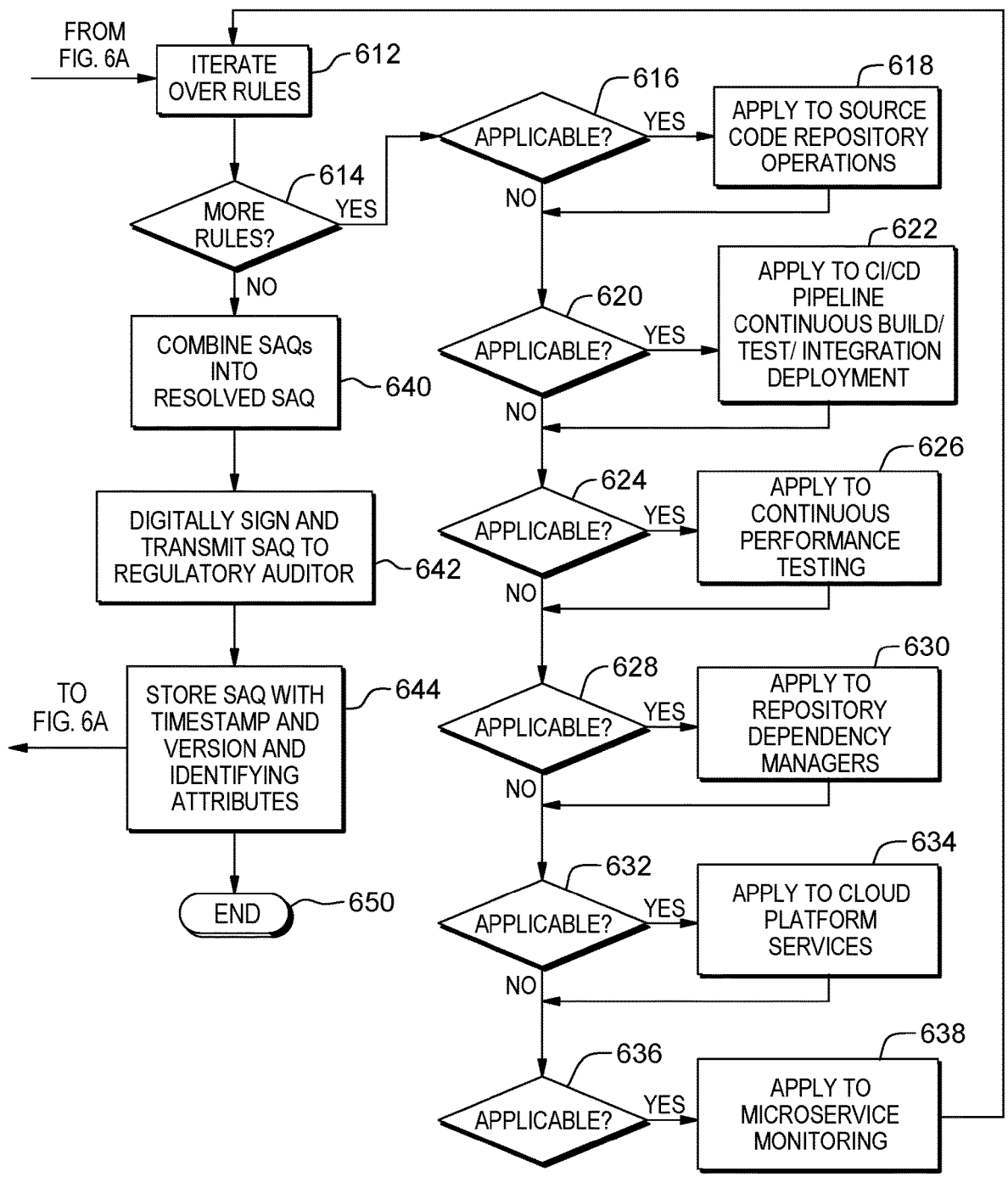

FIGS. 6A & 6B depict one embodiment of logic for applying continuous compliance with a set of regulations across a development and operations pipeline of a microservice, in accordance with one or more aspects of the present invention.

Referring to FIG. 6A, processing starts 600 with the natural language parser service querying the compliance authority's website for the latest version number of the set of regulations 602. If there is no new version 604, then the previously curated set of rules is valid, and the locally stored ontology and report templates for compliance checks can be retrieved 610 from local ontology metadata datastore 608. Otherwise, a new or revised ontology is generated 606. In one or more embodiments, the compliance rules can initially be retrieved from the compliance authority, written in text, and parsed by the natural language parser, or other cognitive agent. Additionally, the natural language parser, or other cognitive agent, classifies textual rules and converts the rules into a rules language capable of being stored and used by the rules engine in the evaluation of compliance decisions. The generated compliance rules can be stored into the ontology metadata datastore 608.

Referring to FIG. 6B, the workflow iterates over the compliance rules 612 and finds the applicable external tool integrations and source code where the rules may apply.

Processing determines whether there is a further rule in the compliance rules to be applied 614, and if "yes", determines whether the rule is applicable to the different stages of the development and operations pipeline for the microservice. As illustrated, in one embodiment, the workflow determines whether a particular compliance rule is applicable 616 to the source code repository operations stage 618, and if "yes", applies the compliance rule to the source code repository operations stage. Processing then determines whether the particular compliance rule is applicable 620 to the CI/CD pipeline continuous build/test/integration/deployment stage, and if "yes", applies the compliance rule to the CI/CD pipeline continuous build/test/integration/deployment stage 622. Processing also determines whether the compliance rule is applicable 624 to the continuous performance testing stage, and if "yes", applies the rule to the continuous performance testing stage 626. Processing determines whether the compliance rule is applicable 628 to the repository dependency managers stage, and if "yes", applies the compliance rule to the repository dependent managers stage 630, and then determines whether the compliance rule is applicable to the cloud platform services stage 632. If "yes", then the compliance rule is applied to the cloud platform services 634. Thereafter, processing determines whether the compliance rule is applicable 636 to the microservice monitoring stage, and if "yes", applies the compliance rule to the microservice monitoring stage 638.

Those skilled in the art will note from the above that the workflow iterates over the rules and finds the applicable external tool integrations and source code where the rules apply. If a rule is applicable, the rule is curated to be used by that external tool for use in its scanner, as described below. The curated rule is related to the external tool, and stored in the ontology metadata datastore. This process continues until all authority rules are handled. Note in this regard that a compliance rule can be applicable to more than one stage of the development and operations pipeline. This process builds the ontology dynamically, and the scanners will have up-to-date rules upon which to generate their individual self-assessment questionnaire reports, which are then combined or coalesced into a resolved self-assessment questionnaire report 640 once all compliance rules have been processed. In one or more embodiments, the coalesced self-assessment questionnaire report is digitally signed and transmitted to a regulatory auditor 642, and stored with a timestamp and a version number with identifying attributes 644, for instance, in the local ontology metadata datastore 608 (FIG. 6A), which completes one cycle of the processing 650.

Advantageously, in one or more embodiments, the compliance or security regime or authority that the microservice and its DevSecOps pipeline are to comply with can provide the set of regulations and self-assessment questionnaire reporting templates for audit purposes. By law, federal and state regulations are publically available, with updates published before compliance is required. Once a version of the set of regulations is changed and becomes public, it is the responsibility of those subject to the regulations to update their internal systems to ensure that they are compliant. DevSecOps processing first order of business is to correct and complete compliance of its pipeline operations, whether internal or third party. Curating compliance rules and policies as disclosed herein is presented as an automated process, so that when the authority publishes updates, the new rules are automatically curated and incorporated into the DevSecOps compliance process. As part of this automated processing, one or more stages of the DevSecOps pipeline can be configured with scanners, as discussed further below with reference to FIGS. 7A-8.

DevOps or DevSecOps scanners are configured to scan relevant components, whether source code, network, process, performance monitor, plug-in, browser, or third party provided. Available scanners are designed for automation, and are typically executed each and every time the DevOps or DevSecOps build executes. The scanners in use today provide reports of the scans and characterize the results in terms of numerical or descriptive quality gates. If the scanners are calibrated to coincide with the compliance authority, then the reports the scanners produce can be used as part of the DevSecOps rules engine. This means that each and every time that the DevSecOps pipeline runs, it will be able to show if any stage is out of compliance, and raise an alert so that a review and compare can be made until compliance is once again achieved and an SAQ report can be generated.

Figure 7A:
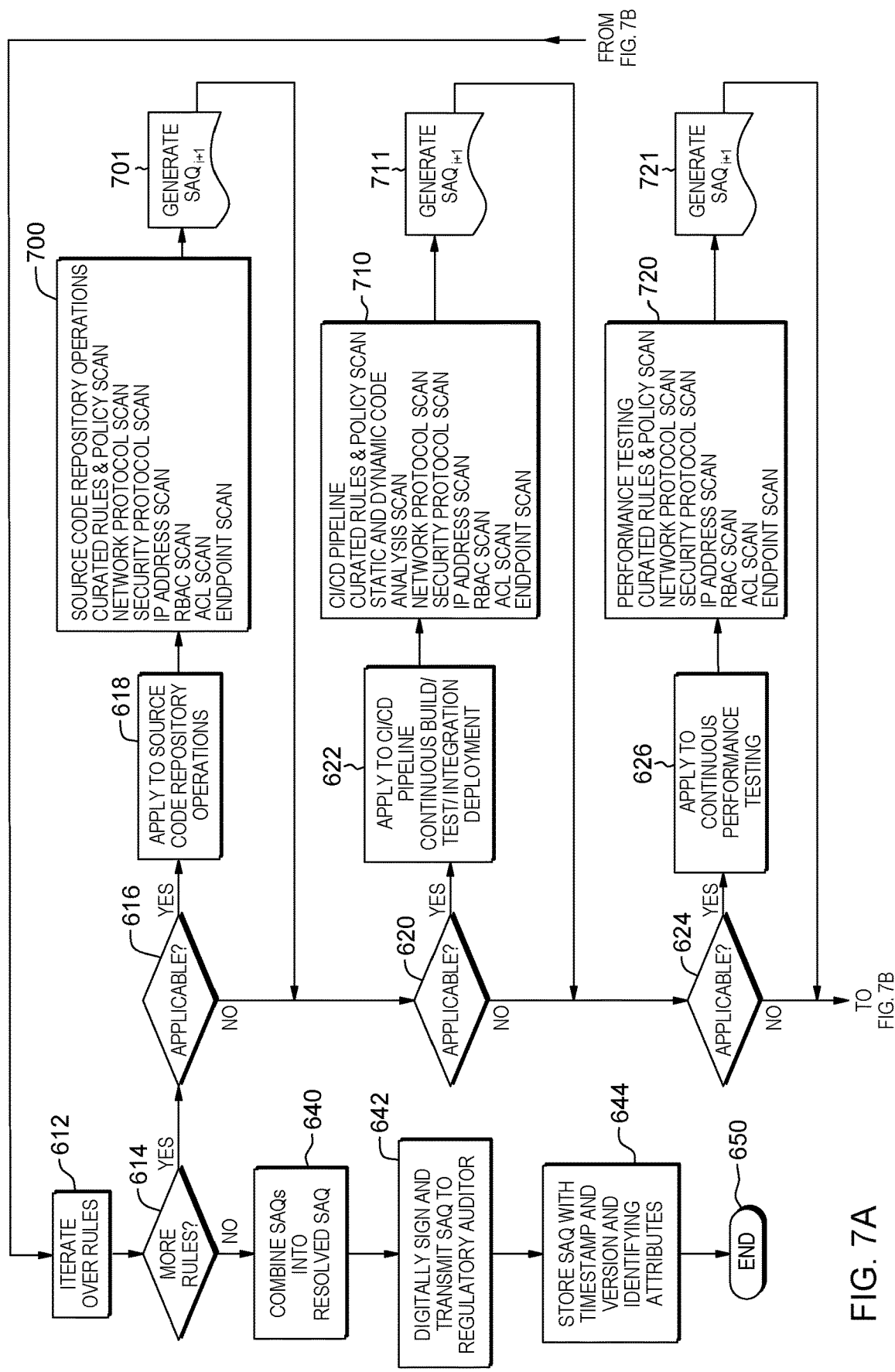
FIGS. 7A & 7B depict a more detailed embodiment of logic for applying continuous compliance processing to a microservice development and operations pipeline, in accordance with one or more aspects of the present invention.
Figure 7B:
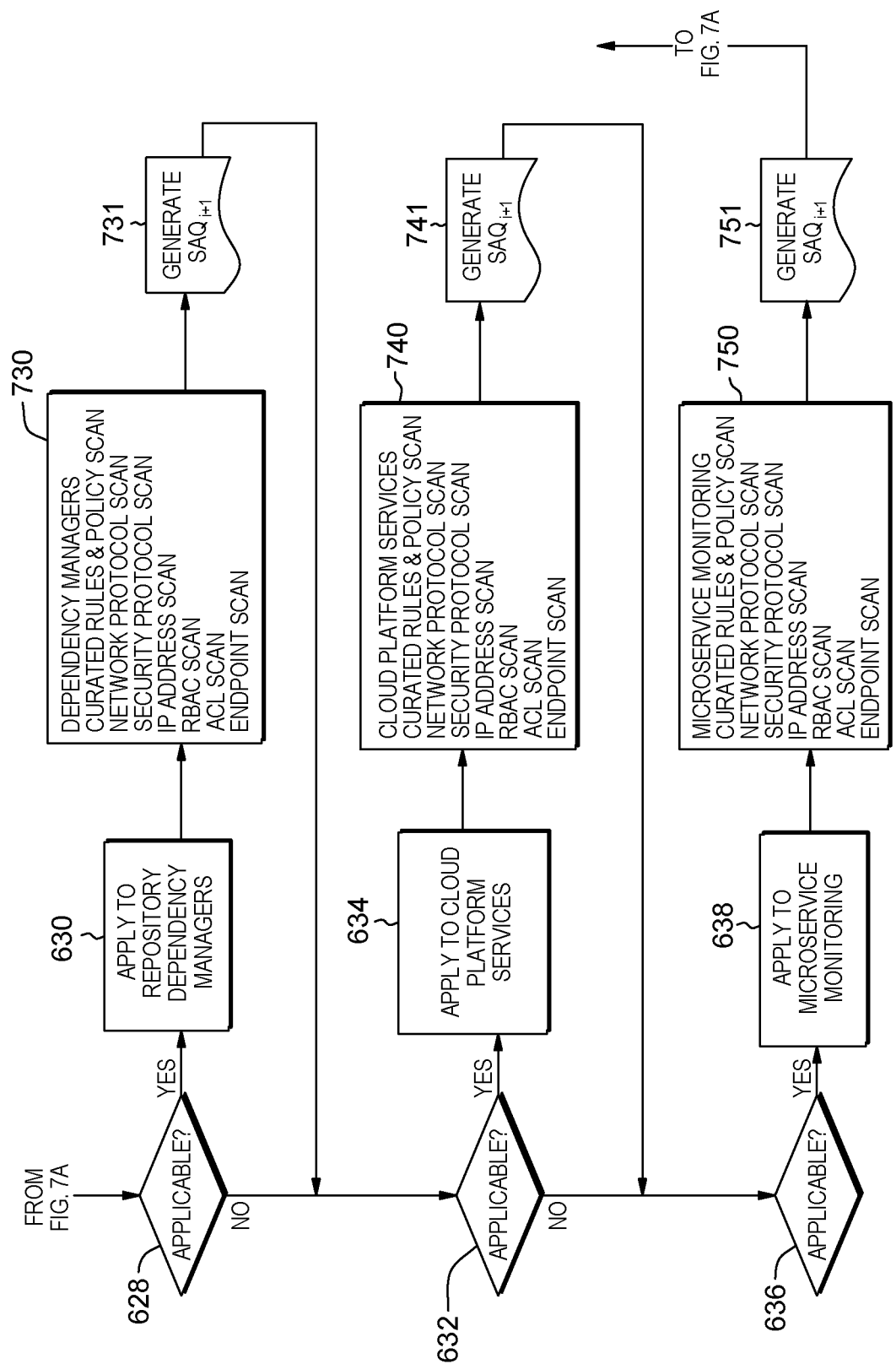

FIGS. 7A & 7B further expand upon one embodiment of the compliance rules processing of FIG. 6B described above. In particular, FIG. 6B is expanded to reference, for each stage, one embodiment of applicable scans or scanners that can be used in connection with an applicable compliance rule (or compliance query), as described herein.

Referring to FIGS. 7A & 7B, and expanding upon the description provided above with respect to FIG. 6B, applying a compliance rule to the source code repository operation stage can include, in one or more embodiments, performing a curated rules and policies scan, a network protocol scan, a security protocol scan, an IP address scan, a rules-based access control (RBAC) scan, an access control list (ACL) scan, and endpoint scan 700. In one or more embodiments, in order to apply a compliance rule to an individual scanner, which is assumed to be a commercially available scanner, the compliance rule is written in the language of the particular scanner to be employed. The scanner accepts properly formatted (curated) rules, along with input from the rules engine, and is able deliver vulnerability assessments, such as rated by risk, which can be color-coded (in one embodiment). From this information, a self-assessment questionnaire report can be generated for the particular stage 701. Similarly, applying the compliance rule to the CI/CD pipeline stage can include applying the rule to a curated rules and policy scan, a static and dynamic code analysis scan, a network protocol scan, a security protocol scan, an IP address scan, an RBAC scan, an ACL scan, and an endpoint scan 710, after which a report, such as a corresponding self-assessment questionnaire report, is generated 711. Note that the particular scans or scanners employed in the different stages for processing the compliance rules can be the same or different, depending on the stages.

Continuing with FIGS. 7A & 7B, applying a compliance rule to the continuous performance testing stage can include performing a curated rules and policies scan, a network protocol scan, a security protocol scan, an IP address scan, an RBAC scan, an ACL scan, and an endpoint scan 720, after which a corresponding report is generated 721. Processing an applicable compliance rule against the repository dependency managers can include performing a curated rules and policies scan, a network protocol scan, a security protocol scan, an IP address scan, an RBAC scan, an ACL scan, and an endpoint scan 730, after which the corresponding report is generated 731. Applying a compliance rule to the cloud platform services can include performing a curated rules and policies scan, as well as a network protocol scan, a security protocol scan, an IP address scan, an RBAC scan, an ACL scan, and an endpoint scan 740, based upon which the corresponding report 741 is generated. Applying the compliance rule to microservice monitoring can including performing a curated rules and policies scan, a network protocol scan, a security protocol scan, an IP address scan, an RBAC scan, an ACL scan, and an endpoint scan 750, based upon which the corresponding self-assessment questionnaire report 751 is generated.

In the above manner, the compliance facility workflow iterates over the compliance rules and finds the applicable external tool integrations and source code where the rules apply. If a rule is applicable, the rule is curated to be used by the external tool for use in its scanner(s). The curated rule is related to the external tool, and stored, in one or more embodiments, in the ontology metadata datastore. This process continues until all rules have been handled. The process builds the ontology dynamically, and the scanners will then have up-to-date rules upon which to generate their reports, which are then coalesced into the resolved self-assessment questionnaire report, which can be digitally signed and transmitted to the regulatory auditor, as well as stored, as described above.

Figure 8:
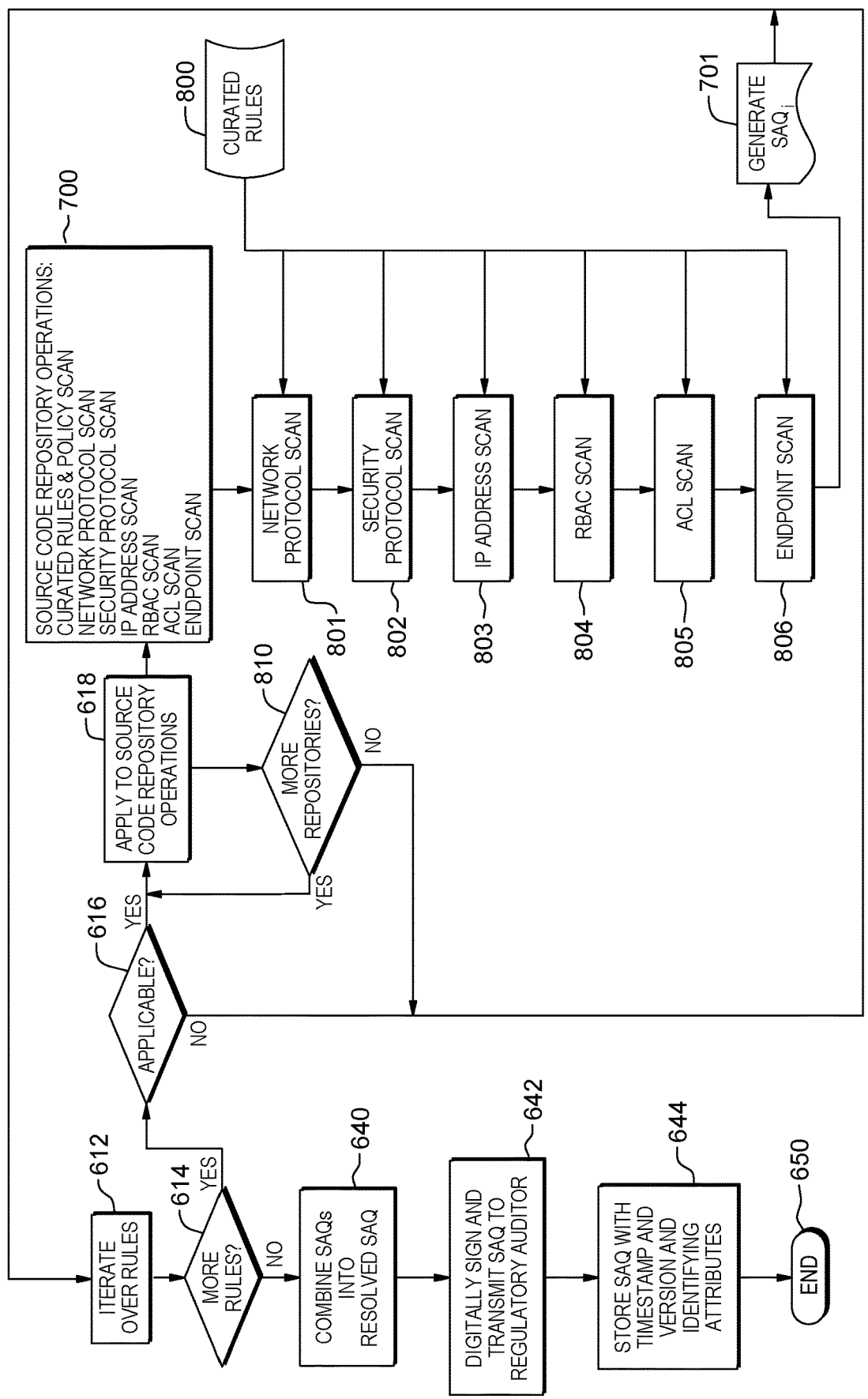
FIG. 8 depicts one embodiment of logic for applying continuous compliance processing to an external source code repository operations stage of a microservice development and operations pipeline, in accordance with one or more aspects of the present invention.

FIG. 8 depicts one embodiment of further details of the above-described processing for applying continuous compliance to the source code repository operation stage (by way of example only). The processing is as described above in connection with FIGS. 6B & 7A, with the particular scans shown separated out for clarity of description. In particular, the curated rules and policies scan produces one or more curated rules 800 to be applied to the source code repository operation stage using, in one embodiment, the types of scans or scanners identified (by way of example). In particular, the applicable curated rules are provided to the appropriate scans, including a network protocol scan 801, a security protocol scan 802, an IP address scan 803, an RBAC scan 804, an ACL scan 805, and an endpoint scan 806, after which the self-assessment questionnaire report for the particular stage can be generated. As part of applying the compliance rule to the source code repository operations, processing can apply the compliance rule to multiple repositories 810.

One or more aspects of the present invention are inextricably tied to computer technology and facilitate processing within a computer or computing environment, improving performance thereof. Further details of embodiments of facilitating processing within a computing environment, as it relates to one or more aspects of the present invention, are described herein. Advantageously, in one or more aspects, facilitating processing within a computing environment is supported in which a dynamic and extensible compliance facility is provided to ensure that microservices, for instance, separated from a monolithic application, are compliant with a set of regulations of a compliance authority, without affecting the spirit of a microservice design. The compliance facility is automated, using a cognitive agent, to extract from a set of regulations, for instance, available at an authority website, and extract compliance attributes, rules and policies therefrom, and apply them to a microservice. In one or more embodiments, the microservice is a cloud-based service, and the compliance facility itself can be configured as one or more microservices as well. The compliance facility includes a rules engine that reports compliance status per any newly updated data obtained from the compliance authority website and stored locally in a rules datastore. The automated compliance facility advantageously saves time, as well as automatically keeping up to date with latest set of regulations from a compliance authority website. The curated attributes, rules and policies are dynamically extracted from the authority's website, ensuring up-to-date compliance.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
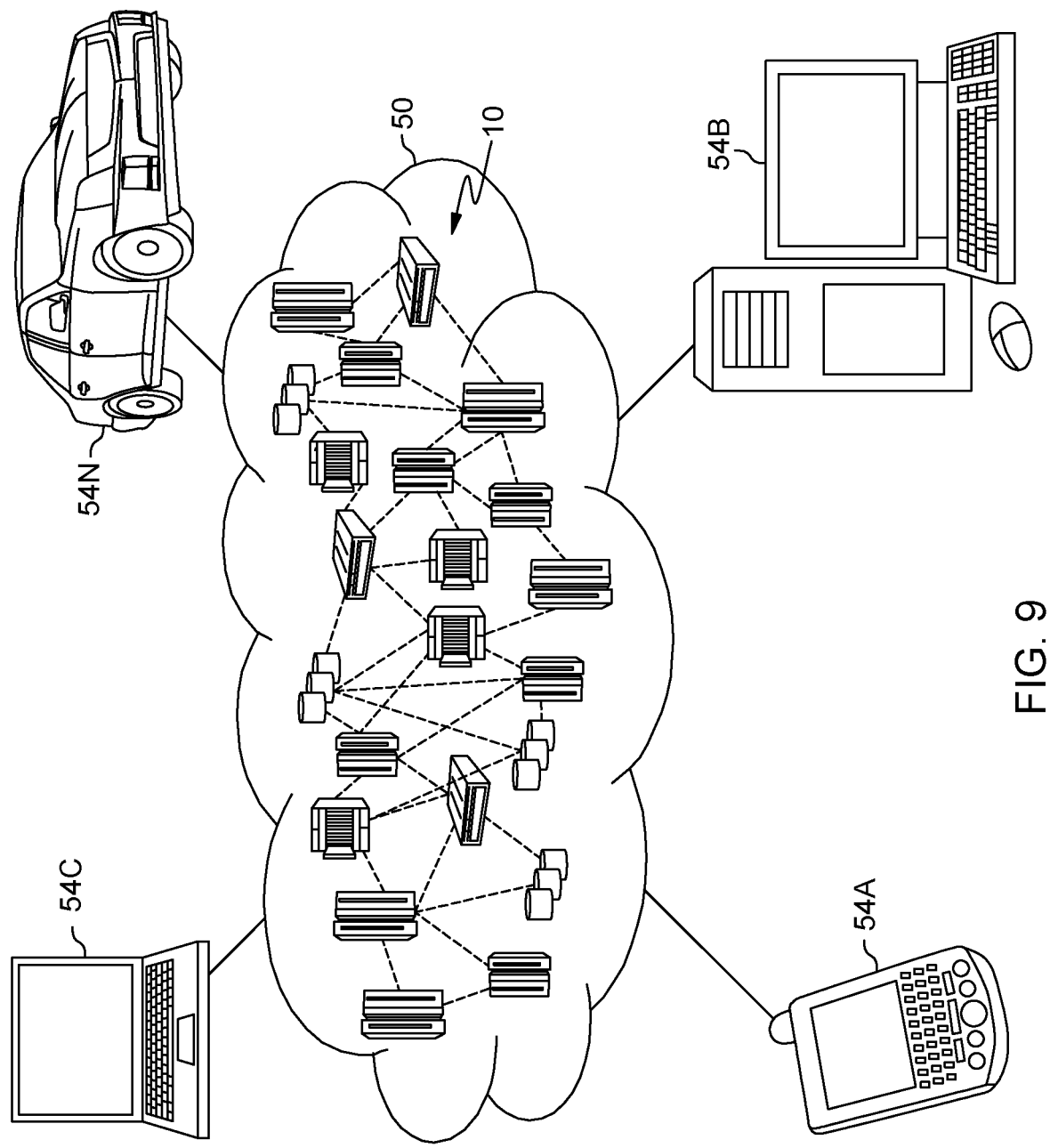
FIG. 9 depicts one embodiment of a cloud computing environment which can facilitate implementing, or be used in association with, one or more aspects of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 10:
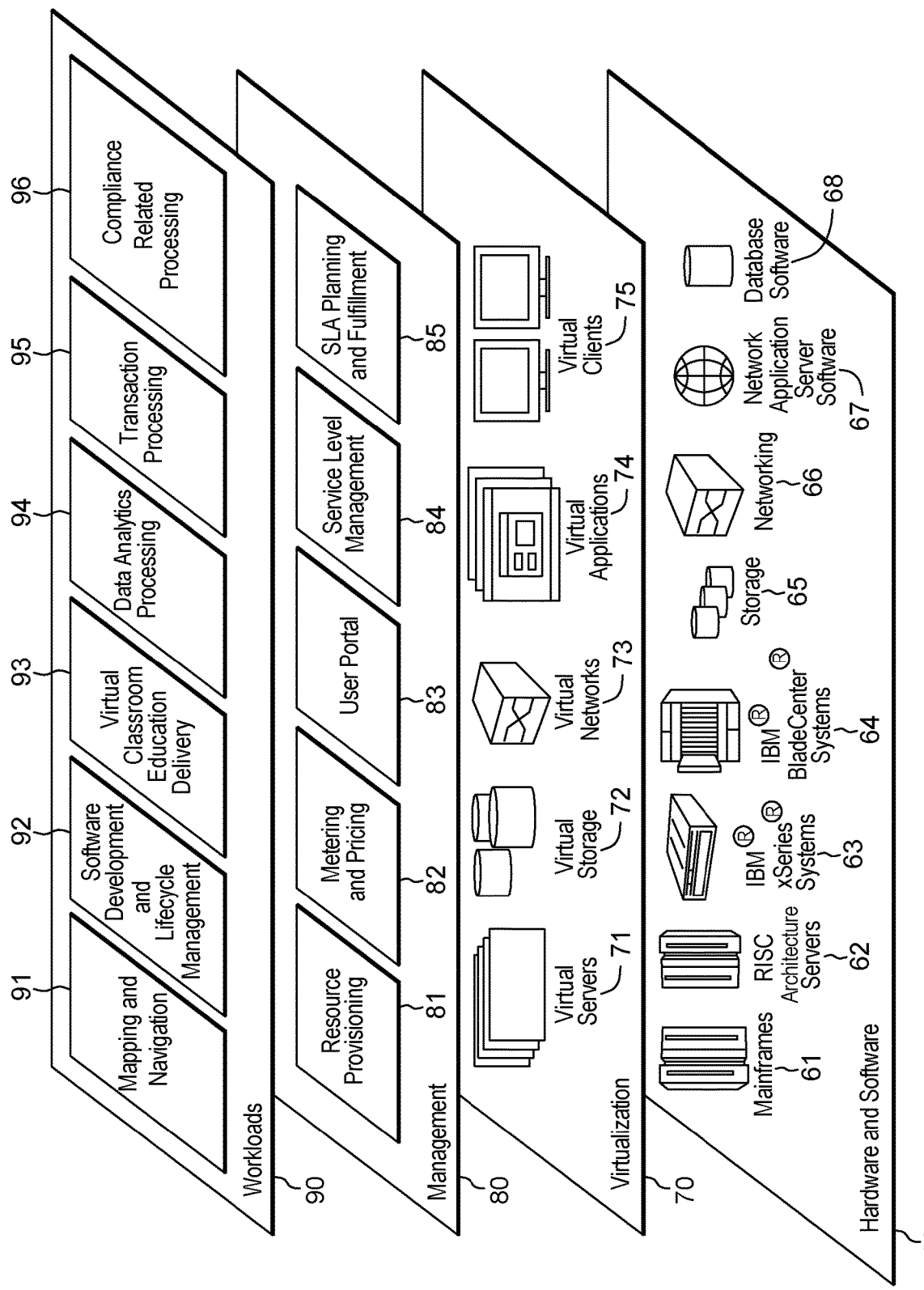
FIG. 10 depicts an example of abstraction model layers, which can facilitate implementing processing, in accordance with one or more aspects of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compliance-related processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used, if desired.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of evaluating microservice compliance with a set of regulations, the computer-implemented method comprising:
   parsing, by a natural language parser, the set of regulations for which microservice compliance is to be evaluated, the set of regulations being access by the natural language parser across a network;
   generating an ontology in a local database including attributes, rules and policies obtained from the parsing of the set of regulations;
   creating a rules engine according to the ontology, the rules engine comprising compliance rules, and including an application program interface (API) that allows responses from a microservice to compliance queries derived from one or more of the compliance rules;
   receiving, by the rules engine, responses from the microservice to the compliance queries, the microservice being instrumented with a message queue invocation as one or more annotations to facilitate processing the compliance queries provided by the rules engine; and
   generating, by the rules engine, a regulation-compliance report for the microservice based on the received responses to the compliance queries.

2. The computer-implemented method of claim 1, wherein generating the ontology includes generating the ontology as a current ontology saved in the local database from parsed regulations of the set of regulations, the local database being accessible to the rules engine and used to generate, by the rules engine, applicable compliance queries to the microservice from the compliance rules.

3. The computer-implemented method of claim 1, further comprising checking, by the natural language parser, a version number associated with the set of regulations, and proceeding with the parsing based on a new version number being identified for the set of regulations for which microservice compliance is to be evaluated.

4. The computer-implemented method of claim 1, wherein the annotation(s) for the microservice is executed to process the compliance queries and generate the responses, including for each compliance query either a compliant or non-compliant indication.

5. The computer-implemented method of claim 1, further comprising storing, by the rules engine, the regulation-compliance report as a self-assessment questionnaire (SAQ) report for the microservice, and transmitting the self-assessment questionnaire (SAQ) report to a compliance auditor and/or authority.

6. The computer-implemented method of claim 1, wherein the creating comprises classifying textural rules of the ontology using the natural language parser and machine learning to create the rules engine.

7. The computer-implemental method of claim 6, further comprising applying the compliance rules to a development and operation (DevOp) pipeline of the microservice, the applying comprising determining for each stage of multiple stages of the development and operation pipeline whether a compliance rule of the compliance rules applies to that stage, and based on the compliance rule being applicable to the stage, applying the compliance rule to the stage to ensure compliance of that stage of the development and operation pipeline of the microservice.

8. The computer-implemented method of claim 7, wherein applying the compliance rule to the stage to ensure compliance of the stage of the development and operation pipeline of the microservice comprises performing a plurality of scans of the stage of the development and operation pipeline of the microservice related to the compliance rule.

9. The computer-implemented method of claim 8, wherein the plurality of scans are selected from the group consisting of a curated rules and policy scan, a network protocol scan, a security protocol scan, an Internet Protocol (IP) address scan, a rule-based access control (RBAC) scan, an access control list (ACL) scan, and an endpoint scan.

10. The computer-implemented method of claim 8, wherein the plurality of stages are selected from the group consisting of a source code repository operation stage, a continuous build/test/integration/development stage, a continuous performance testing stage, a repository-dependency manager stage, a cloud platform services stage, and a microservice monitoring stage.

11. The computer-implemented method of claim 1, wherein the generated ontology in the local database comprises a plurality of fields, the plurality of fields being selected from the group consisting of:
   Version of Set of Regulations;
   Priority;
   RuleSet {Rule 1, Rule 2 . . . };
   PolicySet {Policy 1, Policy 2 . . . };
   PolicyGroups {Group 1, Group 2 . . . };
   Effective Begin Date;
   Effective End Date;
   Report Required Switch;
   Acknowledge Notify Flag; and
   Self-Assessment Questionnaire (SAQ) Templates {SAQ1, SAQ2 . . . }.

12. A computer system comprising:
a memory; and
a processor in communication with the memory, wherein the computer system is configured to perform a method comprising:
- parsing, by a natural language parser, the set of regulations for which microservice compliance is to be evaluated, the set of regulations being access by the natural language parser across a network;
- generating an ontology in a local database including attributes, rules and policies obtained from the parsing of the set of regulations;
- creating a rules engine according to the ontology, the rules engine comprising compliance rules, and including an application program interface (API) that allows responses from a microservice to compliance queries derived from one or more of the compliance rules;
- receiving, by the rules engine, responses from the microservice to the compliance queries, the microservice being instrumented with a message queue invocation as one or more annotations to facilitate processing the compliance queries provided by the rules engine; and
- generating, by the rules engine, a regulation-compliance report for the microservice based on the received responses to the compliance queries.

13. The computer system of claim 12, wherein generating the ontology includes generating the ontology as a current ontology saved in the local database from parsed regulations of the set of regulations, the local database being accessible to the rules engine and used to generate, by the rules engine, applicable compliance queries to the microservice from the compliance rules.

14. The computer system of claim 12, wherein the annotation(s) for the microservice is executed to process the compliance queries and generate the responses, including for each compliance query either a compliant or non-compliant indication.

15. The computer system of claim 12, further comprising storing, by the rules engine, the regulation-compliance report as a self-assessment questionnaire (SAQ) report for the microservice, and transmitting the self-assessment questionnaire (SAQ) report to a compliance auditor and/or authority.

16. The computer system of claim 12, wherein the creating comprises classifying textural rules of the ontology using the natural language parser and machine learning to create the rules engine.

17. The computer system of claim 16, further comprising applying the compliance rules to a development and operation (DevOp) pipeline of the microservice, the applying comprising determining for each stage of multiple stages of the development and operation pipeline whether a compliance rule of the compliance rules applies to that stage, and based on the compliance rule being applicable to the stage, applying the compliance rule to the stage to ensure compliance of that stage of the development and operation pipeline of the microservice.

18. The computer system of claim 17, wherein applying the compliance rule to the stage to ensure compliance of the stage of the development and operation pipeline of the microservice comprises performing a plurality of scans of the stage of the development and operation pipeline of the microservice related to the compliance rule.

19. A computer program product comprising: a non-transitory computer readable storage medium readable by a processing circuit and storing instructions for execution by the processing circuit for performing a method comprising:
- parsing, by a natural language parser, the set of regulations for which microservice compliance is to be evaluated, the set of regulations being access by the natural language parser across a network;
- generating an ontology in a local database including attributes, rules and policies obtained from the parsing of the set of regulations;
- creating a rules engine according to the ontology, the rules engine comprising compliance rules, and including an application program interface (API) that allows responses from a microservice to compliance queries derived from one or more of the compliance rules;
- receiving, by the rules engine, responses from the microservice to the compliance queries, the microservice being instrumented with a message queue invocation as one or more annotations to facilitate processing the compliance queries provided by the rules engine; and
- generating, by the rules engine, a regulation-compliance report for the microservice based on the received responses to the compliance queries.

20. The computer program product of claim 19, wherein the creating comprises classifying textural rules of the ontology using the natural language parser and machine learning to create the rules engine, and wherein the method further includes storing, by the rules engine, the regulation-compliance report as a self-assessment questionnaire (SAQ) report for the microservice, and transmitting the self-assessment questionnaire (SAQ) report to a compliance auditor or authority.

* * * * *